US012077225B2

(12) United States Patent
Zhang

(10) Patent No.: US 12,077,225 B2
(45) Date of Patent: Sep. 3, 2024

(54) HYDRAULIC SYSTEM SWITCHABLE BETWEEN FIXED- DISPLACEMENT AND FIXED/VARIABLE-DISPLACEMENT, CONTROL METHOD THEREOF AND WORKING MACHINE

(71) Applicant: Shanghai Sany Heavy Machinery Co., Ltd., Shanghai (CN)

(72) Inventor: Ning Zhang, Shanghai (CN)

(73) Assignee: Shanghai Sany Heavy Machinery Co., Ltd., Shanghai (CN)

( * ) Notice: Subject to any disclaimer, the term of this patent is extended or adjusted under 35 U.S.C. 154(b) by 0 days.

(21) Appl. No.: 18/323,341

(22) Filed: May 24, 2023

(65) Prior Publication Data

US 2023/0294759 A1   Sep. 21, 2023

Related U.S. Application Data

(63) Continuation of application No. PCT/CN2021/141643, filed on Dec. 27, 2021.

(30) Foreign Application Priority Data

Oct. 29, 2021   (CN) .......................... 202111274729.4

(51) Int. Cl.
  *B62D 5/065* (2006.01)
  *B62D 5/12* (2006.01)
  *F15B 11/16* (2006.01)
(52) U.S. Cl.
  CPC ............... *B62D 5/065* (2013.01); *B62D 5/12* (2013.01); *F15B 11/165* (2013.01); *F15B 2211/20553* (2013.01)
(58) Field of Classification Search
  CPC .................. B62D 5/065; F15B 2211/20553
  See application file for complete search history.

(56) References Cited

U.S. PATENT DOCUMENTS 5,562,019 A * 10/1996 Kropp .................... F15B 11/168
   91/531
2002/0108486 A1* 8/2002 Sannomiya ........... E02F 9/2217
   91/436

(Continued)

FOREIGN PATENT DOCUMENTS

CN      203228847 U   10/2013
CN      103522929 A    1/2014

(Continued)

OTHER PUBLICATIONS

International Search Report issued in corresponding PCT Application No. PCT/CN2021/141643, dated Apr. 13, 2022.

(Continued)

*Primary Examiner* — Reinaldo Sanchez-Medina
(74) *Attorney, Agent, or Firm* — Westbridge IP LLC

(57) ABSTRACT

Disclosed are a hydraulic system, a control method and a working machine. The hydraulic system includes an oil tank, a working pump, a control cylinder controlling a displacement changing mechanism, a working oil line communicating with an output main path of the working pump, a load-sensing system including a load-sensing circuit outputting hydraulic pressure based on load, a load-sensing valve and a switching-control valve switchable between a first-valve-position and a second-valve-position. When differential pressure between the first and second control ports is greater than a first threshold, the output main path communicates with an input port of the control cylinder; when it is less than the first threshold, the input port communicates with an oil return port of the oil tank. Based on this, operators can switch the hydraulic system between the fixed-displacement mode and the fixed/variable-displacement mode, thereby achieving a better balance between energy conservation and performance.

10 Claims, 4 Drawing Sheets

(56) References Cited

U.S. PATENT DOCUMENTS

| | | | | |
|---|---|---|---|---|
| 2012/0216871 | A1* | 8/2012 | Hindman | F15B 11/17 137/594 |
| 2017/0370382 | A1* | 12/2017 | Kondo | E02F 9/2004 |
| 2019/0194006 | A1* | 6/2019 | Matsuo | B62D 5/07 |
| 2019/0345694 | A1* | 11/2019 | Schmuttermair | B60P 1/00 |

FOREIGN PATENT DOCUMENTS

| | | |
|---|---|---|
| CN | 104358286 A | 2/2015 |
| CN | 104929183 A | 9/2015 |
| CN | 105201944 A | 12/2015 |
| CN | 205035847 U | 2/2016 |
| CN | 105387032 A | 3/2016 |
| CN | 106284481 A | 1/2017 |
| CN | 106480927 A | 3/2017 |
| CN | 106759621 A | 5/2017 |
| CN | 107489663 A | 12/2017 |
| CN | 107724454 A | 2/2018 |
| CN | 207526787 U | 6/2018 |
| CN | 208907420 U | 5/2019 |
| CN | 110131226 A | 8/2019 |
| CN | 209604346 U | 11/2019 |
| CN | 209741961 U | 12/2019 |
| CN | 111255007 A | 6/2020 |
| CN | 211144944 U | 7/2020 |
| CN | 211525216 U | 9/2020 |
| CN | 113212093 A | 8/2021 |
| CN | 214423459 U | 10/2021 |
| JP | H1037905 A | 2/1998 |
| JP | H11351203 A | 12/1999 |
| JP | 2002114488 A | 4/2002 |

OTHER PUBLICATIONS

Notification to Grant Patent Right for Invention issued in counterpart Chinese Patent Application No. 202111274729.4, dated Jun. 1, 2022.

* cited by examiner

HYDRAULIC SYSTEM SWITCHABLE BETWEEN FIXED- DISPLACEMENT AND FIXED/VARIABLE-DISPLACEMENT, CONTROL METHOD THEREOF AND WORKING MACHINE

CROSS-REFERENCE TO RELATED APPLICATIONS

This application is a continuation of International Application No. PCT/CN2021/141643, filed on Dec. 27, 2021, which claims priority to Chinese Patent Application No. 202111274729.4, filed on Oct. 29, 2021. The disclosures of the above-mentioned applications are hereby incorporated by reference in their entireties.

TECHNICAL FIELD

The present disclosure relates to the technical field of hydraulic systems, and in particular, to a hydraulic system switchable between fixed-displacement and fixed/variable-displacement, a control method thereof and a working machine.

BACKGROUND

With the development of the pursuit of energy conservation and environmental protection in society, hydraulic systems with load-sensing fixed/variable-displacement of working machines have been applied. A hydraulic working system is no longer a hydraulic working system only with full displacement output, but a hydraulic working system using a variable piston pump and a load-sensing system which can adjust flow rate based on actual demand of loads, so as to achieve the effect of energy conservation and emission reduction through on-demand distribution.

However, in some application scenarios, a hydraulic system with load-sensing fixed/variable-displacement will be affected to a certain extent, and its performance and efficiency are not as good as those of a fixed-displacement hydraulic system.

For example, in terms of steering performance and loading efficiency of a working machine, a fixed/variable-displacement hydraulic system will be affected to a certain extent, and in such scenario, a fixed-displacement hydraulic system has relative advantages.

Therefore, how to achieve a better balance between energy conservation and performance by switching a hydraulic system between a fixed/variable displacement mode and a fixed displacement mode has become an important technical problem to be solve for those skilled in the art.

SUMMARY

The disclosure provides a hydraulic system switchable between fixed-displacement and fixed/variable-displacement, a control method thereof and a working machine. Operators can switch the hydraulic system between a fixed displacement mode and a fixed/variable displacement mode, thereby achieving a better balance between energy conservation and performance.

A first aspect of the present disclosure provides a hydraulic system switchable between fixed-displacement and fixed/variable-displacement. The hydraulic system includes:
an oil tank, including an oil supply port and an oil return port;
a working pump, including a displacement changing mechanism for changing a displacement of the working pump, wherein an oil inlet of the working pump is in fluid communication with the oil supply port of the oil tank;
a control cylinder, used for controlling the displacement changing mechanism;
a working oil line, in fluid communication with an output main path of the working pump;
a load-sensing system, including a load-sensing circuit which outputs hydraulic pressure based on load; and
a load-sensing valve and a fixed/variable-displacement switching control valve, wherein a first control port and a second control port of the load-sensing valve are respectively in fluid communication with the output main path and the fixed/variable-displacement switching control valve; both the working oil line and the load-sensing circuit are in fluid communication with the fixed/variable-displacement switching control valve; the load-sensing valve is in fluid communication with the output main path, the oil return port of the oil tank and an input port of the control cylinder;
the fixed/variable-displacement switching control valve is switchable between a first valve position and a second valve position; when the fixed/variable-displacement switching control valve is in the first valve position, the load-sensing circuit is in fluid communication with the second control port of the load-sensing valve; when the fixed/variable-displacement switching control valve is in the second valve position, the working oil line is in fluid communication with the second control port of the load-sensing valve;
when a differential pressure between input pressure of the first control port and input pressure of the second control port is greater than a first threshold, the output main path is in fluid communication with the input port of the control cylinder; when the differential pressure between the input pressure of the first control port and the input pressure of the second control port is less than the first threshold, the input port of the control cylinder is in fluid communication with the oil return port of the oil tank.

According to the hydraulic system switchable between fixed-displacement and fixed/variable-displacement provided by the present disclosure, the hydraulic system further includes:
a pressure cut-off control valve, wherein the load-sensing valve is in fluid communication with the input port of the control cylinder through the pressure cut-off control valve, and the pressure cut-off control valve includes a third control port;
when a differential pressure between the output main path and the oil return port of the oil tank is less than a second threshold, the load-sensing valve is in fluid communication with the input port of the control cylinder; when the differential pressure between the output main path and the oil return port of the oil tank is greater than the second threshold, the output main path is in fluid communication with the input port of the control cylinder.

According to the hydraulic system switchable between fixed-displacement and fixed/variable-displacement provided by the present disclosure, the hydraulic system further includes: a solenoid valve and a shuttle valve both of which are used for controlling the fixed/variable-displacement switching control valve, wherein the fixed/variable-displacement switching control valve includes a fourth control port; the shuttle valve is in fluid communication with the fixed/variable-displacement switching control valve, a pilot oil line and the fourth control port, separately; the solenoid valve is in fluid communication with a control oil line and the oil return port of the oil tank, separately;

the solenoid valve can provide fluid communication between the shuttle valve and one of the control oil line and the oil return port of the oil tank; when the shuttle valve is in fluid communication with the oil return port of the oil tank, the pilot oil line is in fluid communication with the fourth control port, and the fixed/variable-displacement switching control valve is in the first valve position; when the shuttle valve is in fluid communication with the control oil line, the control oil line is in fluid communication with the fourth control port, and the fixed/variable-displacement switching control valve is in the second valve position.

According to the hydraulic system switchable between fixed-displacement and fixed/variable-displacement provided by the present disclosure, the displacement changing mechanism includes:

a swash plate, used for controlling the displacement of the working pump, wherein the control cylinder is capable of driving the swash plate to switch between a minimum tilt angle and a maximum tilt angle; and an elastic element, acting on the swash plate, wherein when the control cylinder is in an oil draining state, the elastic element is capable of driving the swash plate to switch to the maximum tilt angle.

According to the hydraulic system switchable between fixed-displacement and fixed/variable-displacement provided by the present disclosure, the working pump is a steering pump for providing steering hydraulic pressure.

According to the hydraulic system switchable between fixed-displacement and fixed/variable-displacement provided by the present disclosure, the solenoid valve is a two-position three-way solenoid directional control valve.

According to the hydraulic system switchable between fixed-displacement and fixed/variable-displacement provided by the present disclosure, the fixed/variable-displacement switching control valve is a hydraulic-control two-position four-way directional control valve.

A second aspect of the present disclosure provides a control method applied to the hydraulic system switchable between fixed-displacement and fixed/variable-displacement as mentioned in any one of the above embodiments. The control method includes:

controlling the fixed/variable-displacement switching control valve to be in the first valve position, so that the load-sensing circuit is in fluid communication with the second control port;

when the differential pressure between input pressure of the first control port and input pressure of the second control port is greater than a first threshold, the working pump is in a variable displacement state;

when the differential pressure between the input pressure of the first control port and the input pressure of the second control port is less than the first threshold, the working pump is in a fixed displacement state.

According to the control method provided by the present disclosure, the control method further includes: controlling the fixed/variable-displacement switching control valve to be in the second valve position, so that the working pump is in the fixed displacement state.

A third aspect of the present disclosure provides a working machine, which includes the hydraulic system switchable between fixed-displacement and fixed/variable-displacement as mentioned in any one of the above embodiments.

Firstly, the hydraulic system switchable between fixed-displacement and fixed/variable-displacement provided by the present disclosure includes an oil tank, a working pump, a control cylinder, a working oil line, a load-sensing system, a load-sensing valve and a fixed/variable-displacement switching control valve. When the control cylinder is in the pressure relief state, the displacement changing mechanism of the working pump is not controlled by the control cylinder, and the displacement changing mechanism is in the maximum open position, that is, the working pump is in the fixed displacement state; when the piston rod of the control cylinder expands and contracts under the action of hydraulic pressure, the piston rod acts on the displacement changing mechanism, thereby causing the working pump in a fixed/variable displacement state. Specifically, the working process of the hydraulic system is as follows.

When the operator needs to switch the hydraulic system to the fixed/variable mode, the fixed/variable-displacement switching control valve should be controlled to be in the first valve position. When the fixed/variable-displacement switching control valve is in the first valve position, the load-sensing circuit is in fluid communication with the second control port of the load-sensing valve. In this case, the valve position of the load-sensing valve is under the control of the differential pressure between the input pressure of the first control port and the input pressure of the second control port, and the first control port is in fluid communication with the output main path of the working pump, such that the valve position of the load-sensing valve is at this moment under the control of the differential pressure between the output main path of the working pump and the load-sensing circuit.

When the differential pressure between the input pressure of the first control port and the second control port is greater than the first threshold, that is, when the differential pressure between the output main path of the working pump and the load-sensing circuit is greater than the first threshold, the output main path is in fluid communication with the input port of the control cylinder, such that the displacement of the working pump is controlled based on the hydraulic pressure of the output main path, and the working pump is in the variable displacement state.

When the differential pressure between the input pressure of the first control port and the input pressure of the second control port is less than the first threshold, that is, when the differential pressure between the output main path of the working pump and the load-sensing circuit is less than the first threshold, the input port of the control cylinder is in fluid communication with the oil return port of the oil tank, such that the working pump is in the fixed displacement state.

In this way, the fixed/variable displacement mode of the working pump is achieved.

When the operator needs to switch the hydraulic system to the fixed displacement mode, the fixed/variable-displacement switching control valve should be controlled to be in the second valve position. When the fixed/variable-displacement switching control valve is in the second valve position, the working oil line is in fluid communication with the second control port of the load-sensing valve. In this case, the valve position of the load-sensing valve is under the control of the differential pressure between the input pressure of the first control port and the input pressure of the second control port, and the first control port is in fluid communication with the output main path of the working pump, such that the valve position of the load-sensing valve is at this moment under the control of the differential pressure between the output main path of the working pump and the working oil line. Since the differential pressure between the output main path of the working pump and the working oil line is less than the first threshold, the load-sensing valve is in the state where the input port of the control cylinder is in fluid communication with the oil return port of the oil tank, thus the working pump is in the fixed displacement state.

In this way, by controlling the valve position of the fixed/variable-displacement switching control valve, the operator can control the working pump to switch between the fixed displacement state and the fixed/variable displacement state, thereby achieving a better balance between energy conservation and performance of the hydraulic system.

Secondly, in a further technical scheme of the disclosure, the hydraulic system further includes a pressure cut-off control valve which is a hydraulic control valve, and the pressure cut-off control valve includes a third control port in fluid communication with the output main path. When the differential pressure between the output main path of the working pump and the oil return port of the oil tank is less than the second threshold, the load-sensing valve is in fluid communication with the input port of the control cylinder. When the differential pressure between the oil return port of the oil tank and the output main path is greater than the second threshold, the load-sensing valve is fluidly disconnected from the input port of the control cylinder, and the output main path of the working pump is in fluid communication with the input port of the control cylinder.

In this way, when the pressure of the output main path of the working pump is large enough and the differential pressure between the output main path of the working pump and the oil return port of the oil tank exceeds the second threshold, the fluid communication between the load-sensing valve and the control cylinder is automatically cut off, and the output main path of the working pump is in fluid communication with the input port of the control cylinder, so that the displacement of the working pump can be reduced, thus the high-pressure protection can be achieved.

Thirdly, the disclosure further provides a control method applied to the hydraulic system switchable between fixed-displacement and fixed/variable-displacement, and further provides a working machine. Operators can switch the hydraulic system between the fixed displacement mode and the fixed/variable displacement mode, thereby achieving a better balance between energy conservation and performance. The derivation process of this beneficial effect is similar to that of the above-mentioned hydraulic system switchable between fixed-displacement and fixed/variable-displacement, and will not be repeated here.

BRIEF DESCRIPTION OF THE DRAWINGS

In order to explain the technical scheme of the present disclosure or the prior art more clearly, the drawings needed in the description of the embodiments or the prior art will be briefly introduced below. Obviously, the drawings in the following description are some embodiments of the present disclosure, and other drawings can be obtained according to these drawings without creative work for ordinary people in the field.

DETAILED DESCRIPTIONS OF THE EMBODIMENTS

In order to make the purpose, technical scheme and advantages of the present disclosure more clear, the technical scheme in the present disclosure will be described clearly and completely with reference to the attached drawings. Obviously, the described embodiments are part of the embodiments of the present disclosure, but not all of them. Based on the embodiments in the present disclosure, all other embodiments obtained by ordinary technicians in the field without inventive works belong to the scope of protection of the present disclosure.

Figure 1:
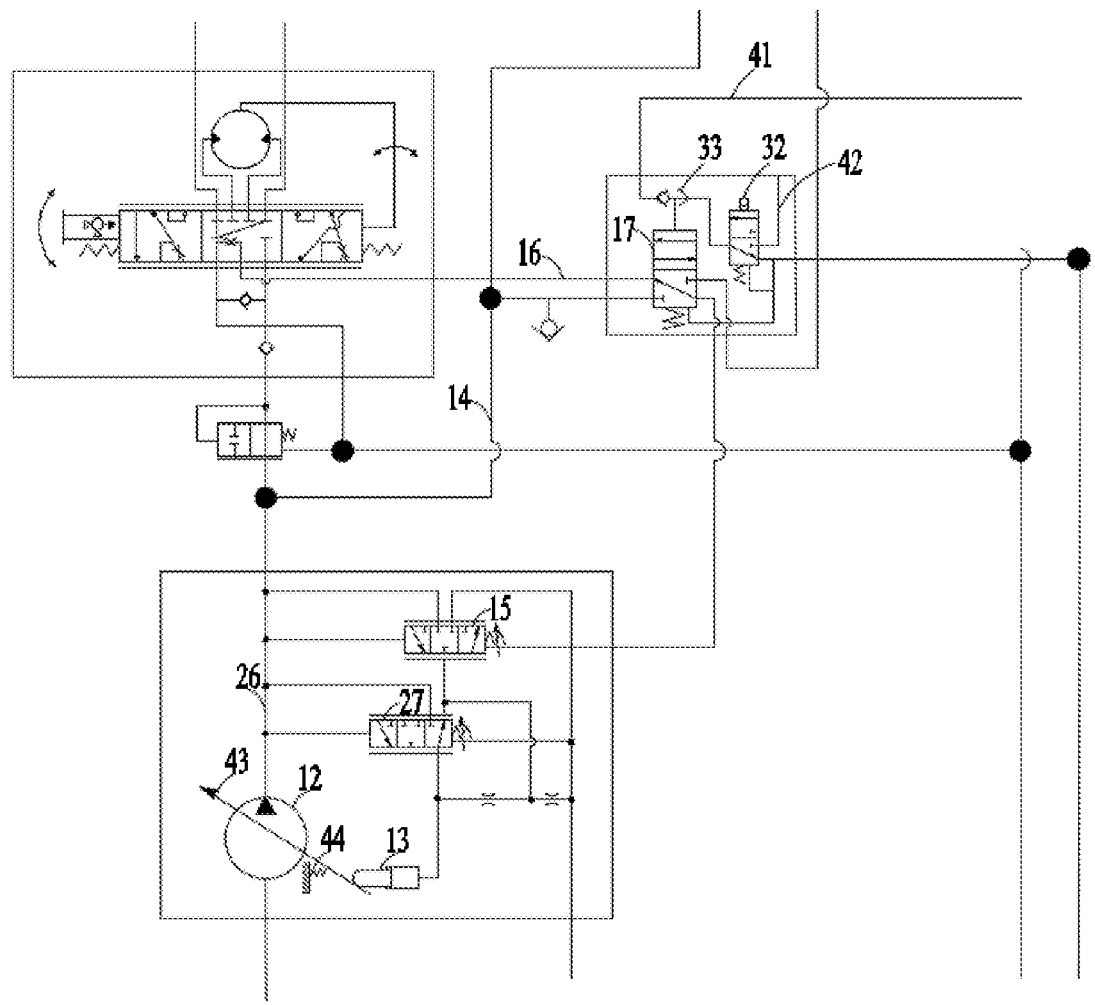
FIG. 1 is a schematic diagram illustrating a working pump and an oil line of a hydraulic system according to an embodiment of the present disclosure.
Figure 2:
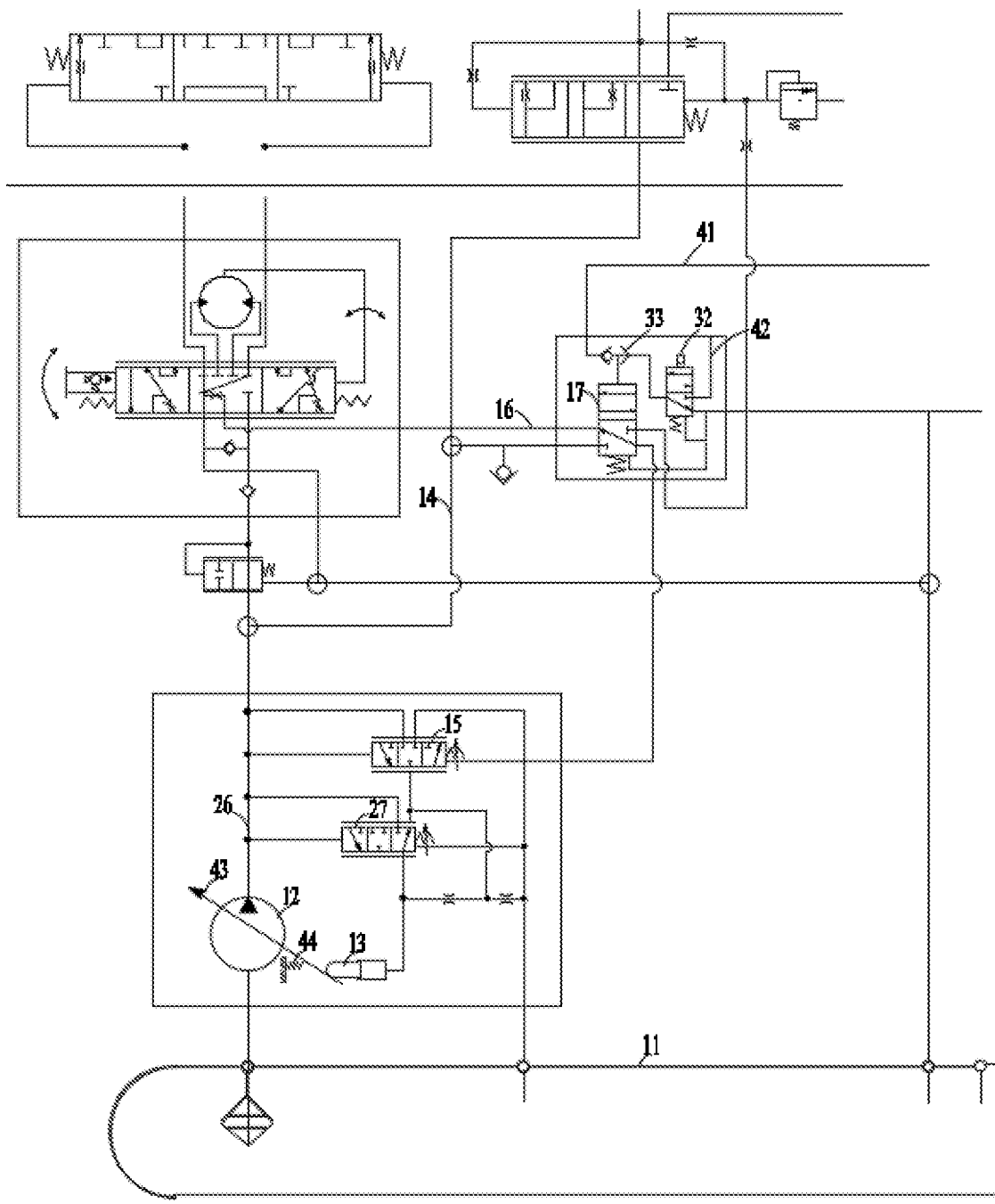
FIG. 2 is a schematic diagram illustrating the working pump, the oil tank and the oil line of the hydraulic system according to the embodiment of the present disclosure.
Figure 3:
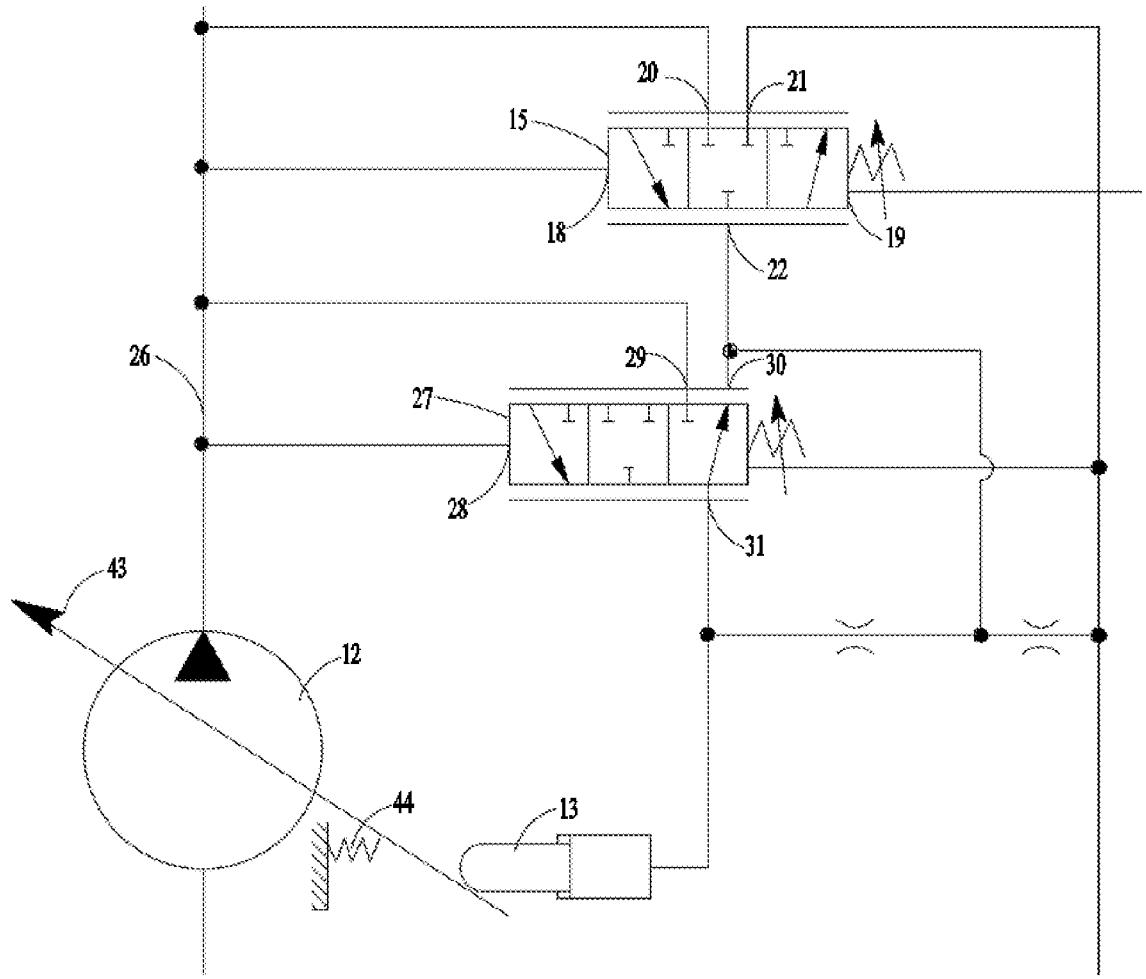
FIG. 3 is a schematic diagram illustrating the connection of the working pump, a load-sensing valve and a pressure cut-off control valve according to the embodiment of the disclosure.
Figure 4:
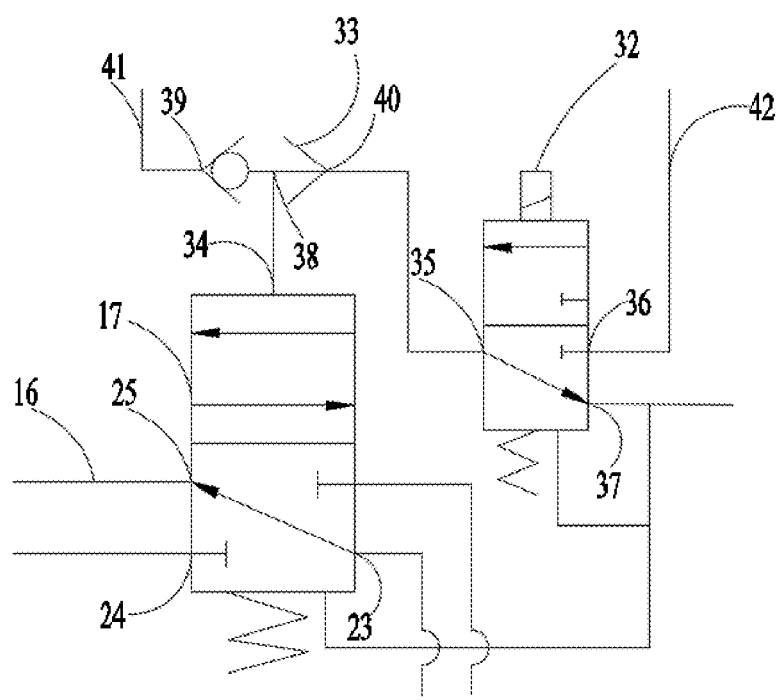
FIG. 4 is a schematic diagram illustrating the connection of a fixed/variable-displacement switching control valve, a solenoid valve and a shuttle valve in the embodiment of the disclosure.

The hydraulic system switchable between fixed-displacement and fixed/variable-displacement in embodiments of the present disclosure will be described below with reference to FIGS. 1-4. The hydraulic system includes an oil tank 11, a working pump 12, a control cylinder 13, a working oil line 14, a load-sensing system, a load-sensing valve 15 and a fixed/variable-displacement switching control valve 17.

The oil tank 11 includes an oil supply port and an oil return port, and the hydraulic oil flows out through the oil supply port and returns through the oil return port. The working pump 12 includes a displacement changing mechanism used for changing a displacement of the working pump 12, and an oil inlet of the working pump 12 is in fluid communication with the oil supply port of the oil tank 11. The control cylinder 13 is used to control the displacement changing mechanism. The working oil line 14 is in fluid communication with an output main path 26 of the working pump 12. The load-sensing system includes a load-sensing circuit 16 that outputs hydraulic pressure based on load.

The load-sensing valve 15 includes a first control port 18, a second control port 19, a first valve port 20, a second valve port 21 and a third valve port 22. The load-sensing valve 15 is a hydraulic-control valve, and its valve position is controlled by the differential pressure between input pressure of the first control port 18 and input pressure of the second control port 19.

The fixed/variable-displacement switching control valve 17 includes a fourth valve port 23, a fifth valve port 24 and a sixth valve port 25. The fixed/variable-displacement switching control valve 17 can be controlled by an operator and can be switched between a first valve position and a second valve position. When the fixed/variable-displacement switching control valve 17 is in the first valve position, the sixth valve port 25 is in fluid communication with the fourth valve port 23, that is, the load-sensing circuit 16 is in fluid communication with the second control port 19 of the load-sensing valve 15. When the fixed/variable-displacement switching control valve 17 is in the second valve position, the fifth valve port 24 is in fluid communication with the fourth valve port 23, that is, the working oil line 14 is in fluid communication with the second control port 19 of the load-sensing valve 15.

The first control port 18 of the load-sensing valve 15 is in fluid communication with the output main path 26, the second control port 19 is in fluid communication with the fourth valve port 23, the fifth valve port 24 is in fluid communication with the working oil line 14, the sixth valve port 25 is in communication with the load-sensing circuit 16, the first valve port 20 is in fluid communication with the output main path 26, the second valve port 21 is in fluid communication with the oil return port of the oil tank 11, and the third valve port 22 is in fluid communication with the input port of the control cylinder 13.

The load-sensing valve 15 is switchable between a third valve position and a fourth valve position. When the load-sensing valve 15 is in the third valve position, the first valve port 20 is in fluid communication with the third valve port 22; when the load-sensing valve 15 is in the fourth valve position, the second valve port 21 is in fluid communication with the third valve port 22. When the differential pressure between the input pressure of the first control port 18 and the input pressures of the second control port 19 is greater than the first threshold, the load-sensing valve 15 is in the third valve position; when the differential pressure between the input pressure of the first control port 18 and the input pressure of the second control port 19 is less than the first threshold, the load-sensing valve 15 is in the fourth valve position.

When the operator needs to switch the hydraulic system to the fixed/variable mode, the fixed/variable-displacement switching control valve 17 should be controlled to be in the first valve position. When the fixed/variable-displacement switching control valve 17 is in the first valve position, the sixth valve port 25 is in fluid communication with the fourth valve port 23, that is, the load-sensing circuit 16 is in fluid communication with the second control port 19 of the load-sensing valve 15. In this case, the valve position of the load-sensing valve 15 is under the control of the differential pressure between the input pressure of the first control port 18 and the input pressure of the second control port 19, and the first control port 18 is in fluid communication with the output main path 26 of the working pump 12, such that the valve position of the load-sensing valve 15 is at this moment under the control of the differential pressure between the output main path 26 of the working pump 12 and the load-sensing circuit 16.

When the differential pressure between the input pressure of the first control port 18 and the input pressure of the second control port 19 is greater than the first threshold, that is, when the differential pressure between the output main path 26 of the working pump 12 and the load-sensing circuit 16 is greater than the first threshold, the load-sensing circuit 15 is in the third valve position, that is, the output main path 26 is in fluid communication with the input port of the control cylinder 13, such that the displacement of the working pump 12 is controlled based on the hydraulic pressure of the output main path 26, and the working pump 12 is in the variable displacement state.

When the differential pressure between the input pressure of the first control port 18 and the input pressure of the second control port 19 is less than the first threshold, that is, when the differential pressure between the output main path 26 of the working pump 12 and the load-sensing circuit 16 is less than the first threshold, the load-sensing circuit 15 is in the fourth valve position, the input port of the control cylinder 13 is in fluid communication with the oil return port of the oil tank 11, such that the working pump 12 is in the fixed displacement state.

In this way, the fixed/variable displacement mode of the working pump 12 is achieved.

When the operator needs to switch the hydraulic system to the fixed displacement mode, the fixed/variable-displacement switching control valve 17 should be controlled to be in the second valve position. When the fixed/variable-displacement switching control valve 17 is in the second valve position, the fifth valve port 24 is in fluid communication with the fourth valve port 23, that is, the working oil line 14 is in fluid communication with the second control port 19 of the load-sensing valve 15. In this case, the valve position of the load-sensing valve 15 is under the control of the differential pressure between the input pressure of the first control port 18 and the input pressure of the second control port 19, and the first control port 18 is in fluid communication with the output main path 26 of the working pump 12, such that the valve position of the load-sensing valve 15 is at this moment under the control of the differential pressure between the output main path 26 of the working pump 12 and the working oil line 14. The differential pressure between the output main path 26 of the working pump 12 and the working oil line 14 is less than the first threshold, such that the load-sensing valve 15 is in the fourth valve position, that is, the input port of the control cylinder 13 is in fluid communication with the oil return port of the oil tank 11, thus the working pump 12 is in the fixed displacement state.

In this way, by controlling the valve position of the fixed/variable-displacement switching control valve 17, the operator can control the working pump 12 to switch between the fixed displacement state and the fixed/variable displacement state, such that a better balance between energy conservation and performance of the hydraulic system can be achieved.

In a further embodiment, the hydraulic system switchable between fixed-displacement and fixed/variable-displacement further includes a pressure cut-off control valve 27, the load-sensing valve 15 is in fluid communication with the input port of the control cylinder 13 through the pressure cut-off control valve 27.

The pressure cut-off control valve 27 includes a third control port 28, a seventh valve port 29, an eighth valve port 30 and a ninth valve port 31. The third control port 28 is in fluid communication with the output main path 26, the seventh valve port 29 is in fluid communication with the output main path 26, the eighth valve port 30 is in fluid communication with the third valve port 22, and the ninth valve port 31 is in fluid communication with the input port of the control cylinder 13. When the differential pressure between the oil return port of the oil tank 11 and the output main path 26 is less than the second threshold, the eighth valve port 30 is in fluid communication with the ninth valve port 31, that is, the load-sensing valve 15 is in fluid communication with the input port of the control cylinder 13. When the differential pressure between the oil return port of the oil tank 11 and output main path 26 is greater than the second threshold, the seventh valve port 29 is in fluid communication with the ninth valve port 31, that is, the output main path 26 is in fluid communication with the input port of the control cylinder 13.

It should be noted that the pressure cut-off control valve 27 is a hydraulic control valve, and the pressure cut-off control valve 27 includes a third control port 28 in fluid communication with an output main path 26. When the differential pressure between the output main path 26 of the working pump 12 and the oil return port of the oil tank 11 is less than the second threshold, the eighth valve port 30 is in fluid communication with the ninth valve port 31, that is, the third value port 22 of the load-sensing valve 15 is in fluid communication with the input port of the control cylinder 13. When the differential pressure between the oil return port of the oil tank 11 and the output main path 26 is greater than the second threshold, the seventh valve port 29 is in fluid communication with the ninth valve port 31, that is, the third value port 22 of the load-sensing valve 15 is fluidly disconnected from the input port of the control cylinder 13, and the output main path 26 of the working pump 12 is in fluid communication with the input port of the control cylinder 13.

In this way, when the pressure of the output main path 26 of the working pump 12 is large enough as well as the differential pressure between the output main path 26 of the working pump 12 and the oil return port of the oil tank 11 exceeds the second threshold, the fluid communication between the load-sensing valve 15 and the control cylinder 13 is automatically cut off, and the output main path 26 of the working pump 12 is in fluid communication with the input port of the control cylinder 13, so as to control the working pump 12 to reduce displacement, thereby achieving high-pressure protection.

In a further embodiment, the hydraulic system switchable between fixed-displacement and fixed/variable-displacement further includes a solenoid valve 32 and a shuttle valve 33, the solenoid valve 32 and the shuttle valve 33 are used for controlling the fixed/variable-displacement switching control valve 17, and the fixed/variable-displacement switching control valve 17 includes a fourth control port 34. The solenoid valve 32 includes a tenth valve port 35, an eleventh valve port 36 and a twelfth valve port 37, and the shuttle valve 33 includes a thirteenth valve port 38, a fourteenth valve port 39 and a fifteenth valve port 40.

The thirteenth valve port 38 is in fluid communication with the fourth control port 34, the fourteenth valve port 39 is in fluid communication with the pilot oil line 41, the fifteenth valve port 40 is in fluid communication with the tenth valve port 35, the eleventh valve port 36 is in fluid communication with the control oil line 42, and the twelfth valve port 37 is in fluid communication with the oil return port of the oil tank 11.

The solenoid valve 32 is switchable between the fifth valve position and the sixth valve position. When the solenoid valve 32 is in the fifth valve position, the tenth valve port 35 is in fluid communication with the twelfth valve port 37, such that the fixed/variable-displacement switching control valve 17 is controlled to be in the first valve position. When the solenoid valve is in the sixth valve position, the tenth valve port 35 is in fluid communication with the eleventh valve port 36, such that the fixed/variable-displacement switching control valve 17 is controlled to be in the second valve position.

In this way, when the operator controls the solenoid valve 32 to be in the fifth valve position, the tenth valve port 35 is in fluid communication with the twelfth valve port 37, that is, the fifteenth valve port 40 of the shuttle valve 33 is in fluid communication with the oil tank 11, and the fourth control port 34 of the fixed/variable-displacement switching control valve 17 is in a pressure relief state (i.e., a discharging state), thereby switching the fixed/variable-displacement switching control valve 17 to the first valve position.

When the operator controls the solenoid valve 32 to be in the sixth valve position, the tenth valve port 35 is in fluid communication with the eleventh valve port 36, that is, the fifteenth valve port 40 of the shuttle valve 33 is in fluid communication with the control oil line 42, and the fixed/variable-displacement switching control valve 17 is switched to the second valve position under the pressure of the control oil line 42 which is in fluid communication with the fourteenth control port 34.

Through the coordinated control of the solenoid valve 32 and the shuttle valve 33, a reliable control of the fixed/variable-displacement switching control valve 17 is achieved.

In a further technical scheme, the displacement changing mechanism of the working pump 12 includes a swash plate 43 and an elastic member 44, the displacement of the working pump 12 can be changed by changing the tilt angle of the swash plate 43, and the control cylinder 13 can drive the swash plate 43 to switch between the minimum tilt angle and the maximum tilt angle. The elastic member 44 acts on the swash plate 43 (i.e., presses against the swash plate 43). When the control cylinder 13 is in the oil draining state (i.e., the discharging state), the elastic member 44 can drive the swash plate 43 to the maximum tilt angle.

In this way, when the control cylinder 13 is in the pressure relief state, the elastic member 44 drives the swash plate 43 to the maximum tilt angle, and the working pump 12 is at this moment in the maximum fixed-displacement state.

With the hydraulic pressure, the piston rod of the control cylinder 13 can control the swash plate 43 to switch between the maximum tilt angle and the minimum tilt angle, so as to change the displacement of the working pump 12, thereby causing the working pump 12 in the variable displacement state.

It should be noted that the working pump 12 aforementioned may be a steering pump for providing steering hydraulic pressure, the working oil line 14 may be a steering oil line, the solenoid valve 32 may be a two-position three-way solenoid directional control valve, and the fixed/variable-displacement switching control valve 17 may be a hydraulic-control two-position four-way directional control valve.

The embodiment of the present disclosure also provides a control method applied to the hydraulic system switchable between fixed displacement and fixed/variable displacement according to the above-mentioned embodiments. The control method includes:
controlling the fixed/variable-displacement switching control valve 17 to be in the first valve position, so that the load-sensing circuit 16 is in fluid communication with the second control port 19;
when the differential pressure between the input pressure of the first control port 18 and the input pressure of the second control port 19 is greater than the first threshold, the load-sensing valve 15 is in the third valve position, and the output main path 26 is in fluid communication with the input port of the control cylinder 13, such that the displacement of the working pump 12 is controlled based on the hydraulic pressure of the output main path 26, and the working pump 12 is in the variable displacement state;

When the differential pressure between the input pressure of the first control port 18 and the input pressure of the second control port 19 is less than the first threshold, the load-sensing valve 15 is in the fourth valve position, and the input port of the control cylinder 13 is in fluid communication with the oil return port of the oil tank 11, so that the working pump 12 is in the fixed displacement state;

controlling the fixed/variable-displacement switching control valve 17 to be in the second valve position, so that the working oil line 14 is in fluid communication with the second control port 19, thereby causing the differential pressure between the input pressure of the first control port 18 and the input pressure of the second control port 19 is less than the first threshold value;

when the load-sensing valve 15 is in the fourth valve position, the input port of the control cylinder 13 is in fluid communication with the oil return port of the oil tank 11, so that the working pump 12 is in the fixed displacement state.

In addition, the embodiment of the disclosure also provides a working machine, which includes the hydraulic system switchable between fixed displacement and fixed/variable displacement according to the above-mentioned embodiments.

According to the hydraulic system switchable between fixed-displacement and fixed/variable, the control method thereof and the working machine in the embodiment of the present disclosure, operators can switch the hydraulic system between the fixed displacement mode and the fixed/variable displacement mode, thereby achieving a better balance between energy conservation and performance. The derivation process of this beneficial effect is similar to that of the above-mentioned hydraulic system switchable between fixed-displacement and fixed/variable-displacement, and will not be repeated here.

It should be noted that in this embodiment, the working machine may, specifically, be a loader, a lifting machine, or the like.

Finally, it should be explained that the above embodiments are only used to illustrate the technical scheme of the present disclosure, but not to limit it; although the present disclosure has been described in detail with reference to the foregoing embodiments, those skilled in the art should understand that it is still possible to modify the technical solutions described in the foregoing embodiments, or to replace some technical features with equivalents; however, these modifications or substitutions do not make the essence of the corresponding technical solutions deviate from the spirit and scope of the technical schemes of various embodiments of the present disclosure.

What is claimed is:

1. A hydraulic system switchable between fixed-displacement and fixed/variable-displacement, comprising:
    an oil tank, comprising an oil supply port and an oil return port;
    a working pump, comprising a displacement changing mechanism for changing a displacement of the working pump, wherein an oil inlet of the working pump is in fluid communication with the oil supply port of the oil tank;
    a control cylinder, used for controlling the displacement changing mechanism;
    a working oil line, in fluid communication with an output main path of the working pump;
    a load-sensing system, comprising a load-sensing circuit which outputs hydraulic pressure based on a load; and
    a load-sensing valve and a fixed/variable-displacement switching control valve, wherein a first control port and a second control port of the load-sensing valve are respectively in fluid communication with the output main path and the fixed/variable-displacement switching control valve; both the working oil line and the load-sensing circuit are in fluid communication with the fixed/variable-displacement switching control valve; the load-sensing valve is in fluid communication with the output main path, the oil return port of the oil tank and an input port of the control cylinder;
    the fixed/variable-displacement switching control valve is switchable between a first valve position and a second valve position; when the fixed/variable-displacement switching control valve is in the first valve position, the load-sensing circuit is in fluid communication with the second control port of the load-sensing valve; when the fixed/variable-displacement switching control valve is in the second valve position, the working oil line is in fluid communication with the second control port of the load-sensing valve;
    when a differential pressure between input pressure of the first control port and input pressure of the second control port is greater than a first threshold, the output main path is in fluid communication with the input port of the control cylinder; when the differential pressure between the input pressure of the first control port and the input pressure of the second control port is less than the first threshold, the input port of the control cylinder is in fluid communication with the oil return port of the oil tank.

2. The hydraulic system switchable between fixed-displacement and fixed/variable-displacement according to claim 1, further comprising:
    a pressure cut-off control valve, wherein the load-sensing valve is in fluid communication with the input port of the control cylinder through the pressure cut-off control valve, and the pressure cut-off control valve comprises a third control port,
    wherein when a differential pressure between the output main path and the oil return port of the oil tank is less than a second threshold, the load-sensing valve is in fluid communication with the input port of the control cylinder; when the differential pressure between the output main path and the oil return port of the oil tank is greater than the second threshold, the output main path is in fluid communication with the input port of the control cylinder.

3. The hydraulic system switchable between fixed-displacement and fixed/variable-displacement according to claim 1, further comprising
    a solenoid valve and a shuttle valve both of which are used for controlling the fixed/variable-displacement switching control valve, wherein the fixed/variable-displacement switching control valve comprises a fourth control port; the shuttle valve is in fluid communication with the fixed/variable-displacement switching control valve, a pilot oil line and the fourth control port, separately; the solenoid valve is in fluid communication with a control oil line and the oil return port of the oil tank, separately;
    the solenoid valve is capable of controlling fluid communication between the shuttle valve and one of the control oil line and the oil return port of the oil tank; when the shuttle valve is in fluid communication with the oil return port of the oil tank, the pilot oil line is in fluid communication with the fourth control port, and the fixed/variable-displacement switching control valve is in the first valve position; when the shuttle valve is in fluid communication with the control oil line, the control oil line is in fluid communication with the fourth control port, and the fixed/variable-displacement switching control valve is in the second valve position.

4. The hydraulic system switchable between fixed-displacement and fixed/variable-displacement according to claim 1, wherein
the displacement changing mechanism comprises:
a swash plate, used for controlling the displacement of the working pump, wherein the control cylinder is capable of driving the swash plate to switch between a minimum tilt angle and a maximum tilt angle; and
an elastic element, acting on the swash plate, wherein when the control cylinder is in an oil draining state, the elastic element is capable of driving the swash plate to switch to the maximum tilt angle.

5. The hydraulic system switchable between fixed-displacement and fixed/variable-displacement according to claim 1, wherein
the working pump is a steering pump for providing steering hydraulic pressure.

6. The hydraulic system switchable between fixed-displacement and fixed/variable-displacement according to claim 3, wherein
the solenoid valve is a two-position three-way solenoid directional control valve.

7. The hydraulic system switchable between fixed-displacement and fixed/variable-displacement according to claim 3, wherein
the fixed/variable-displacement switching control valve is a hydraulic-control two-position four-way directional control valve.

8. A control method, applied to the hydraulic system switchable between fixed-displacement and fixed/variable-displacement according to claim 1, comprising:
controlling the fixed/variable-displacement switching control valve to be in the first valve position, so that the load-sensing circuit is in fluid communication with the second control port;
when a differential pressure between input pressure of the first control port and input pressure of the second control port is greater than a first threshold, the working pump is in a variable displacement state;
when the differential pressure between the input pressure of the first control port and the input pressure of the second control port is less than the first threshold, the working pump is in a fixed displacement state.

9. The control method according to claim 8, wherein
the control method further comprises: controlling the fixed/variable-displacement switching control valve to be in the second valve position, so that the working pump is in the fixed displacement state.

10. A working machine, comprising
the hydraulic system switchable between fixed-displacement and fixed/variable-displacement according to claim 1.

* * * * *